United States Patent Office 2,936,307
Patented May 10, 1960

2,936,307
PROCESS OF ANTIBIOTIC EXTRACTION

David A. Johnson and Glenn A. Hardcastle, Jr., Syracuse, and Yvon Gaston Perron, De Witt, N.Y., assignors, by mesne assignments, to Bristol-Myers Company, New York, N.Y., a corporation of Delaware No Drawing. Application December 16, 1957
Serial No. 702,832

10 Claims. (Cl. 260—210)

This invention relates to a new and highly useful process for recovering the antibiotic kanamycin from aqueous solutions thereof, including fermentation broths, and, more particularly, relates to extraction of kanamycin at alkaline pH from water into a water-immiscible solvent such as n-butanol containing an aromatic aldehyde or an unsubstituted aliphatic aldehyde containing 4 to 10 carbon atoms inclusive followed, when desired, by re-extraction into water at acid pH.

The recovery in simple economic fashion and high yield of a water-soluble, basic antibiotic such as kanamycin from dilute aqueous solutions, including fermentation broths and ion exchange resin column eluates, presents a difficult problem. The usual processes of extraction at various pH's are unsatisfactory, even when use is made of a carrier such as lauric acid. No satisfactory methods of precipitation are known which are effective when used on such very dilute solutions. The use of absorption and subsequent elution from ion exchange resins is reasonably satisfactory as a primary recovery step, giving about a ten-fold reduction in volume, but even on repetition fails to give highly concentrated solutions. Thus, the concentration of even the eluate from a second absorption on resin followed by the preferred ammonia elution does not exceed 10,000–20,000 mcg./ml.; much ash is introduced and such relatively dilute solutions require subsequent concentrations in vacuo at alkaline pH which are expensive, time-consuming and tend to cause discoloration and decomposition of the product.

It is the object of the present invention to provide an improved method for the recovery of kanamycin from dilute aqueous solutions, including fermentation broths and ion exchange resin column eluates; such a method must be simple and economical and must lead readily and directly to highly purified and concentrated solutions from which kanamycin, as base or a salt, is very readily obtained in pure crystalline form.

The object of the present invention has been achieved by the provision, according to the present invention, of the process which comprises extracting a dilute aqueous solution of kanamycin at alkaline pH with a lesser volume of a water-immiscible lower alkanol containing from one to ten moles of a monocyclic aromatic aldehyde or an unsubstituted aliphatic aldehyde containing 4 to 10 carbon atoms inclusive per mole of kanamycin in said aqueous solution, separating the alcohol phase and subsequently extracting the kanamycin in said alcoholic solution of kanamycin at acid pH into a lesser volume of aqueous acid and separating the concentrated aqueous solution of kanamycin thus obtained.

A preferred embodiment of the present invention is the process which comprises extracting a dilute aqueous solution of kanamycin at alkaline pH with a lesser volume of n-butanol containing from one to ten moles of a monocyclic aromatic aldehyde or an unsubstituted aliphatic aldehyde containing 4 to 10 carbon atoms inclusive per mole of kanamycin in said aqueous solution, separating the alcohol phase and subsequently extracting the kanamycin in said alcoholic solution of kanamycin below pH 4.0 into a lesser volume of aqueous acid and separating the concentrated aqueous solution of kanamycin thus obtained.

Of the water-immiscible lower alkanols useful in this process, n-butanol is preferred but use may also be made of a pentanol or a hexanol. Surprisingly, solvents frequently used interchangeably with n-butanol, such as methyl isobutyl ketone, ethyl acetate, amyl acetate, chloroform and benzene, are either nearly or entirely useless. The preferred group of aromatic aldehydes for use in the present invention comprises substituted and unsubstituted monocyclic aromatic aldehydes; this group thus includes furfuraldehyde, cinnamaldehyde, 5-nitrofurfuraldehyde, 2-, 3- and 4-formylpyridine, 2- and 3-formylthiophene, benzaldehyde, alkyl benzaldehydes such as p-methylbenzaldehyde and p-isopropylbenzaldehyde, alkoxybenzaldehydes such as anisaldehyde and veratraldehyde, halobenzaldehydes such as p-chlorobenzaldehydes, hydroxybenzaldehydes such as vanillin and salicylaldehyde and alkylaminobenzaldehydes such as p-dimethylaminobenzaldehyde. The group of aliphatic aldehydes useful in the present invention comprises unsubstituted aliphatic aldehydes containing from four to ten carbon atoms inclusive such as n-butyraldehyde, isobutyraldehyde, n-heptaldehyde, 2-ethylhexanal, capraldehyde, n-valeraldehyde and iso-valeraldehyde. The word unsubstituted thus does not include alkyl groups as long as they do not raise the carbon content above ten carbon atoms as is obvious from the use of 2-ethylhexanal for example. The preferred amount of aldehyde is an amount providing at least four moles of aldehyde per mole of kanamycin as determined by simply assay; molar ratios of 4:1 to 8:1 are particularly useful. In other terms, the weight of aldehyde used is best taken in the range of an amount equal to the weight of kanamycin up to double that weight. The extraction into butanol is conducted at alkaline pH, i.e. at a pH above 7.0 but usually below 11. It is convenient, and preferred, to use a pH in the range of 8.5 to 10.5; in the latter case the adjustment is made simply and cheaply with sodium hydroxide. The back extraction from the alkanol into water at acid pH (e.g. dilute aqueous acid) is conducted at acid pH, i.e. pH 4 or lower. Thus, use is made of dilute acetic acid or, preferably, dilute sulfuric acid. When necessary, additional concentrated acid is added to keep the pH below 4. The volume of alkanol used is less than one-half, and preferably one-quarter or less, of the volume of the original aqueous solution. When back-extracting the alkanol solution of kanamycin, the volume of acid water is less than one-quarter, and preferably one-twentieth or less, of the volume of the alkanol. In each of these extractions the distribution coefficients are extraordinarily favorable and run as high as 1000 and even higher. This permits very great volume reductions and indeed the volume of aqueous acid in the second extraction can be reduced to provide virtually any desired concentration of kanamycin.

Recovery of pure crystalline kanamycin from the final extract is extremely simple. Thus, when the final extraction is performed with dilute sulfuric acid, the extract is merely adjusted to pH 8.2, as by the addition of ammonium hydroxide, and to it is slowly added methanol (e.g. one to four volumes and preferably only one volume) to precipitate pure crystalline kanamycin sulfate.

The process of the present invention is effective as illustrated below on any aqueous solution of kanamycin, including fermentation broths. It is particularly effective on resin column eluates containing 1,000–10,000 mcg./ml. kanamycin.

Further understanding of the invention may be obtained by reference to the following examples, which are illustrative only and are not the exclusive embodiment of the invention. We wish it to be understood that we do not desire to be limited to the exact details shown and described, for obvious modifications will occur to persons skilled in the art.

EXAMPLE 1

A very useful process for isolating pure crystalline kanamycin from fermentation broths on a large scale begins with removal of mycelium by filtration of broth which has been acidified to pH 4.5–5 with sulfuric acid. If desired this filtration is facilitated by holding the broth 12 hours at room temperature or 30 minutes at 50° C.; the thinning or increase in fluidity thus produced is attributed to the action of the enzymes present. The acid-filtered broth is then neutralized to about pH 6–7 with sodium hydroxide and absorbed on an IRC–50 resin column in the sodium form. Alternatively, the filtration is omitted and the thinned broth is diluted with an equal volume of water, put through a separator to remove particles larger than 20 mesh, neutralized and absorbed on the column.

After washing the column with water, the kanamycin is eluted with 1 N or 5% $H_2SO_4$ to provide about a tenfold volume reduction.

The acid eluate is then extracted, after adjustment to pH 10 with sodium hydroxide, with one-quarter volume of n-butanol containing two grams benzaldehyde per gram of kanamycin in the eluate. After separation, the butanol phase is washed with one-twentieth volume of water made pH 2 with $H_2SO_4$. After separation the aqueous phase, which contains about 100,000–150,000 mcg./ml. kanamycin sulfate, is decolorized with carbon if desired and then neutralized with $NH_4OH$ to pH 8.2 and to it is added one volume methanol to precipitate crystalline kanamycin sulfate.

EXAMPLE 2

Another process for isolating pure crystalline kanamycin from fermentation broths on a large scale begins with removal of mycelium by filtration of broth which has been acidified to pH 4.5–5 with sulfuric acid. If desired this filtration is facilitated by holding the broth 12 hours at room temperature or 30 minutes at 50° C.; the thinning or increase in fluidity thus produced is attributed to the action of the enzymes present. The acid-filtered broth is then neutralized to about pH 10 with sodium hydroxide and extracted with one-quarter volume of n-butanol containing two grams benzaldehyde per gram of kanamycin in the eluate. After separation, the butanol phase is washed with one-twentieth volume of water made pH 2 with $H_2SO_4$. After separation the aqueous phase, which contains about 100,000–150,000 mcg./ml. kanamycin sulfate is decolorized with carbon if desired and then neutralized with $NH_4OH$ to pH 8.2 and to it is added one volume methanol to precipitate crystalline kanamycin sulfate.

EXAMPLE 3

To 500 ml. of an aqueous solution containing 10 g. of kanamycin sulfate there was added 20 g. benzaldehyde in 200 ml. n-butanol. After the pH had been adjusted to 10.5 with sodium hydroxide the mixture was stirred 15 minutes and the butanol was separated and extracted with 40 ml. water adjusted to pH 2 with sulfuric acid. The aqueous phase was separated, adjusted to pH 8 with ammonium hydroxide and to it was added one volume of methanol to precipitate 7.8 g. crystalline kanamycin sulfate (750 mcg./mgm. by bio-assay; 725 mcg./mgm. by furfural ultra-violet assay). The addition of more methanol gave an additional 9% yield of product.

EXAMPLE 4

An ammonium hydroxide resin column eluate (500 ml. bio-assaying 9300 mcg./ml.) was adjusted to pH 10.5 with sodium hydroxide and extracted with 150 ml. n-butanol containing 10 g. benzaldehyde. The butanol extract was separated and extracted with 30 ml. water adjusted to pH 2.0 with sulfuric acid. The aqueous phase was separated, treated with 0.2 g. carbon, filtered, adjusted to pH 8 with ammonium hydroxide and to it was added one volume methanol to precipitate 4.0 g. crystalline kanamycin sulfate (700 mcg./mgm. by bio-assay; 649 mcg./mgm. by furfural ultra-violet assay).

EXAMPLE 5

An acid eluate at pH 5 of a resin column (2.0 l., 4250 mcg./ml. by bio-assay) was adjusted to pH 10.5 with sodium hydroxide and extracted with 300 ml. n-butanol containing 15 ml. benzaldehyde. The butanol phase was separated and extracted with 30 ml. water adjusted to pH 2 with sulfuric acid. The aqueous phase was separated, adjusted to pH 8 with ammonium hydroxide and to it was added one volume methanol to precipitate 8.25 g. crystalline kanamycin sulfate (640 mcg./mgm. by bio-assay and 610 mcg./mgm. by furfural ultraviolet assay; 62.2% yield by bio-assay). The spent eluate after butanol-benzaldehyde extraction contained 280 mcg./ml. kanamycin.

The same procedure was followed on another 2.0 l. of the same eluate except that the spent butanol containing benzaldehyde from the above experiment was used in place of fresh butanol and benzaldehyde. This procedure was highly successful, giving 8.1 g. crystalline kanamycin sulfate (700 mcg./mgm. by bio-assay and 597 mcg./mgm. by furfural ultraviolet assay; 66.8% yield).

EXAMPLE 6

An acid eluate of a resin column (900 ml., 5200 mcg./ml.) was added to 200 ml. n-butanol containing 15 ml. benzaldehyde and the pH was adjusted to 10.5 with sodium hydroxide. The butanol phase was extracted with 20 ml. water adjusted to pH 2 with sulfuric acid. The aqueous phase was adjusted to pH 8 with ammonium hydroxide and to it was added one volume of methanol to precipitate 4.8 g. crystalline kanamycin sulfate (680 mcg./mgm. by bio-assay and 657 mcg./mgm. by furfural ultraviolet assay; 69.8% yield). The spent aqueous eluate (after butanolbenzaldehyde extraction) contained less than 30 mcg./ml. kanamycin.

EXAMPLE 7

In a series of experiments on portions of the same aqueous solution of kanamycin, one liter of resin column eluate containing 2850 mcg./ml. was mixed with 15 ml. of the aldehyde indicated below and 200 ml. n-butanol adjusted to pH 10.5 with sodium hydroxide and stirred 15 minutes. The butanol phase was then separated and extracted with 25 ml. water adjusted to pH 2 with sulfuric acid. The aqucous phase was separated, adjusted to pH 8.2 with ammonium hydroxide and to it was added an equal volume of methanol to precipitate crystalline kanamycin sulfate. The results were as follows:

| Aldehyde Used | Kanamycin content in mcg./ml. of— | | |
| --- | --- | --- | --- |
| | Spent aqueous eluate | Rich n-butanol before acid extraction | Acid aqueous extract |
| Salicylaldehyde | 540 | 16,500 | 68,750 |
| Benzaldehyde | 120 | 16,000 | 93,750 |
| Anisaldehyde | 980 | 11,500 | 75,000 |
| Cinnamaldehyde | 620 | 12,250 | 82,500 |
| Furfural | 360 | 16,250 | 100,000 |
| Heptaldehyde | <100 | 23,500 | 135,000 |
| 2-Ethyl-hexanal | <100 | 21,000 | 102,500 |

| Aldehyde Used | Crystalline kanamycin sulfate | |
| --- | --- | --- |
| | Weight in grams | Bio-assay in mcg./mgm. |
| Salicylaldehyde | 2.0 | 720 |
| Benzaldehyde | 2.6 | 760 |
| Anisaldehyde | 1.8 | 820 |
| Cinnamaldehyde | 1.84 | 670 |
| Furfural | 1.9 | 910 |
| Heptaldehyde | 2.05 | 790 |
| 2-Ethyl-hexanal | 2.7 | 890 |

The use with benzaldehyde of chloroform or methyl isobutyl ketone was unsuccessful. The use in butanol in place of benzaldehyde of chloral hydrate, chloroacetaldehyde, formaldehyde, cyclohexanone and alpha-hydroxyadipaldehyde was also unsuccessful.

EXAMPLE 8

The general procedure of the previous examples was followed except that whole broth (5 l., 1150 mcg./ml.) was extracted directly with 1 l. n-butanol containing 25 ml. benzaldehyde to lead to a recovery of 3.3 g. crystalline kanamycin sulfate.

EXAMPLE 9

Kanamycin fermentation broth was adjusted with sodium hydroxide to pH 10.5 and found to bio-assay 1200 mcg./ml. Five liters of the filtered broth were then extracted with one liter n-butanol containing 25 ml. benzaldehyde and the extract was worked up as before to give 3.3 g. crystalline kanamycin sulfate.

STARTING MATERIALS

Methods of obtaining the starting materials of the present invention, i.e. kanamycin, kanamycin salts, kanamycin solutions and kanamycin fermentation broths, are set forth in detail below.

Kanamycin is a new antibiotic which is effective in inhibiting the growth of Gram-positive, Gram-negative and acid fast bacteria such as *Mycobacterium tuberculosis*.

Kanamycin is prepared by cultivating a strain of *Streptomyces kanamyceticus nov. spec.* in an aqueous carbohydrate solution containing a nitrogenous nutrient under aerobic conditions until substantial antibacterial activity is imparted to said solution, whereafter the antibiotic is recovered and if necessary purified.

The micro-organism producing kanamycin was isolated from a sample of soils collected in Nagano Prefecture, Japan, and is a new species designated *Streptomyces kanamyceticus* of the genus Streptomyces. A culture has been deposited in the American Type Culture Collection, Washington, D.C. as A.T.C.C. 12853.

*Streptomyces kanamyceticus* has the following characteristics:

(1) Microscopic observation: Substrate mycelium is about $1\mu$ in width and branched. The aerial mycelium developed from submerged mycelium branches and bears the sporophorous at the end. Spirals and whorls are not usually observed.

(2) Glycerol-Czapek agar (27° C.): The growth is colorless at first, lemon yellow later. The reverse side is hay-colored. Aerial mycelium is white to yellow, occasionally with a greenish or faint pinkish tinge. A faint brown soluble pigment occasionally.

(3) Krainsky glucose asparagine agar (27° C.): Growth is colorless to yellow and the reverse side is white, faint pinkish white, yellow or hay-colored. Aerial mycelium is scant, usually developing from the center of the colony and is white, faint pinkish white, faint greenish yellow or yellow. No soluble pigment is usually found.

(4) Calcium malate agar (27° C.): Same as on Krainsky glucose asparagine agar, but growth is slighter. Sometimes there is no growth.

(5) Starch plate (27° C.): Almost same as Krainsky glucose asparagine agar, but growth is restricted and there is no aerial mycelium. Starch is hydrolyzed.

(6) Potato plug (27° C.): Growth is wrinkled, granular surface, faint yellowish brown to yellow. Aerial mycelium is none or scant and white. There is no soluble pigment. Plug beneath the growth is occasionally dark.

(7) Carrot plug (27° C.): Growth is usually scant. When grown it is almost the same as on potato plug.

(8) Peptone water with 0.2% sodium nitrate (27° C.): Surface ring growth is colorless to white yellow, and white growth at bottom. White aerial mycelium occasionally occurs. Nitrite is formed from nitrate. There is no soluble pigment.

(9) Peptone-meat extract agar (37° C.): Growth is wrinkled, white to yellow. There is no aerial mycelium or soluble pigment.

(10) Blood agar (37° C.): Growth is wrinkled, reddish brown with grayish tinge. There is no aerial mycelium or soluble pigment.

(11) Milk (37° C.): There is almost no change and growth is not usually observed at surface.

(12) Loeffler coagulated serum (37° C.): Growth is restricted, white to lemon yellow. There is no aerial mycelium or soluble pigment.

(13) Egg medium (37° C.): Growth is wrinkled. There is no aerial mycelium.

(14) Gelatin: Liquified; no soluble pigment.

(15) Utilization of carbon sources: The following carbon sources were utilized on Czapek salt basal medium: arabinose, dextrin, fructose, galactose, glucose, glycerol, maltose, mannitol, mannose, raffinose, starch, sucrose, succinate. Carbon sources not utilized: inositol, inulin, lactose, rhamnose, sorbose, xylose, acetate. Carbon sources utilized poorly: esculin, salicin, sorbitol, citrate.

(16) Production of the antibiotic, kanamycin.

The above characteristics are sufficient to distinguish the micro-organism from those hitherto described species of streptomyces and to show that the strain K2–J belongs to a novel species. Variation or mutation of the above described organism is naturally expected since such is a common property of the organisms of streptomyces.

The characteristics of this species may be summarized as follows: The growth of the colony is colorless to yellow with or without greenish or pinkish tinge. The reverse of the colony on synthetic agar is colorless, white, faint pinkish white, whitish yellow or hay-colored. The aerial mycelium is white to yellow and spirals and whorls are not formed. A faint brown soluble pigment is produced occasionally on a synthetic medium. Gelatin is liquified and starch is hydrolyzed.

*Streptomyces kanamyceticus* includes the typical strain No. K2–J described above and all natural and artificial variants or mutants thereof.

PRODUCTION OF KANAMYCIN BY FERMENTATION

*Streptomyces kanamyceticus* (K2–J) was first cultured in shake flasks in the following media: (*a*) 0.75% meat extract, 0.75% peptone, 0.3% NaCl, with 1.0% of starch, dextrin, maltose, glucose, lactose, sucrose, or glycerol; (*b*) 2.0% soybean meal, 0.05% KCl, 0.05%

$MgSO_4 \cdot 7H_2O$, 0.5%

NaCl, 0.2% $NaNO_3$, with 1.0% of starch, dextrin, maltose, glucose, lactose, sucrose, or glycerol. The initial pH of all media was adjusted to 7.0. After 24–48 hours shaking in some cases the pH decreased to about 6.0–6.8, but from 72–120 hours the pH rose and became 7.5–8.6.

In the above medium (*b*) containing 2.0% starch, after 3 days of the shaking culture the pH rose to 8.2 and 250. mcg./ml. of kanamycin was produced. In the tank culture with the medium containing 2.0% starch, 0.5% glucose, 1.2% soybean meal, 0.05% KCl, 0.05% $MgSO_4$, 0.1% $K_2PO_4$, 0.3% NaCl, 0.3% peptone and 0.3% $CaCO_3$, the pH at the beginning was slightly lowered (6.6) and again increased and was 8.0 after 43 hours; 273 mcg./ml. of kanamycin was produced after 78 hours.

As the starting material for the production of kanamycin, fermentation broths as described above or crude products obtained by the treatment of the fermentation broths may be employed.

In general terms, kanamycin is preferably produced in media which contain organic nitrogen sources such as soybean meal, cotton seed meal, peanut meal, meat extract, peptone, corn steep liquor or yeast extract. The carbon sources which can be used include starch, dextrin, maltose, glucose, sucrose, lactose, and glycerol. The combination of starch and soybean meal was found to be one of the best and is preferred; the addition of corn steep liquor, peptone, yeast extract, or nitrate to this combination promoted the production of kanamycin. The addition of magnesium sulphate, manganese chloride, or zinc sulphate was promotive; the maximum yield was obtained when the pH of the culture broth became weakly alkaline. The temperature of the cultivation may be varied in a wide range, 25°–35° C., within which the organism may grow, but the temperature of 27°–32° C. is preferable. Generally the cultivation is continued until a substantial quantity of kanamycin is accumulated in the medium. It requires in the deep aerated submerged culture, in general, two to seven days with maximum production usually occurring at from 3 to 5 days. The kanamycin is found in the liquid portion of the fermentation broth.

EXPERIMENTAL METHODS

Shake culture: 150 ml. of the medium was placed in a flask of 500 ml. of volume and sterilized. It was inoculated with the mycelia and spores of the kanamycin-producing organism on the agar medium or with mycelium obtained from a 48-hour shake culture and then shake-cultured on the reciprocating shaking machine (120 strokes per minute and 8 cm. amplitude) at 27°–29°.

Tank culture: A stainless steel fermenter of 400 l. volume was used. One hundred eighty liter or two hundred liter of the medium was placed therein and sterilized at 120° C. for 20 to 30 minutes. The aeration rate was 200.1 of air per minute and the r.p.m. of the stirrer was 200. Silicone, soybean oil or liquid paraffin was used as the antifoam.

EXTRACTION AND PURIFICATION OF KANAMYCIN

In one method of recovering kanamycin from a fermention broth, the broth is concentrated by vacuum evaporation or spray drying. The kanamycin can be extracted from the residue with water, methanol, ethanol or acetone; acidification with HCl improves the dissolving. The antibiotic can be adsorbed by activated carbon from neutral or alkaline aqueous solution and subsequently desorbed into dry or aqueous alcohol or aqueous acetone adjusted to pH 2.0 with hydrochloric acid. Kanamycin is also adsorbed at a pH about 6.0 to 9.0 by cation exchange resins preferably of the carboxylic acid type, such a copolymer of methacrylic acid and divinylbenzene. When adsorbed on a cation exchange resin the antibiotic can be eluted with aqueous hydrochloric acid, aqueous sulphuric acid, or aqueous organic solvents (for instance, 1 N HCl—10% aqueous acetone). Kanamycin can also be eluted by sodium hydroxide or ammonium hydroxide.

The eluate thus obtained can be concentrated by vacuum evaporation or by freeze-drying, and the kanamycin subsequently precipitated from the concentrated solution by adding a solvent in which kanamycin or its salt is substantially insoluble.

In still another method of purification one can use column chromatography with alumina or active carbon. For instance, an aqueous solution of kanamycin (pH 8.0) obtained by the repetition of the cation exchange resin process can be passed through a column containing active carbon and, after washing the column with distilled water, elution is made with 0.5 N $H_2SO_4$. The most active fraction of the eluate is added to methanol and crystalline kanamycin sulphate precipitated.

NATURE OF KANAMYCIN

Kanamycin is obtained as its hydrochloride or sulphate and the free base of kanamycin is obtained from these salts, for instance, removing the sulfuric ion by baryta from kanamycin sulfate solution.

Kanamycin hydrochloride is freely soluble in water, methanol, slightly soluble in ethanol and insoluble in acetone, ethyl acetate, butyl acetate, benzene, ether or petroleum ether.

Kanamycin sulfate is soluble in water and insoluble in methanol, ethanol, acetone, ethyl acetate, and benzene.

The kanamycin base is soluble in water and substantially insoluble in n-butanol, ethyl acetate, butyl acetate, ether, chloroform and benzene.

Kanamycin when dissolved in pyridine and tested, gives positive ninhydrin reaction. Tollens, Sakaguchi and Fehling tests are negative. When the paper strip chromatography was carried out (with Toyo filter paper No. 50 and 0.2% p-toluenesulfonic acid-butanol saturated with water) the Rf value of kanamycin was 0.21–0.26.

Kanamycin exhibits optical activity. When a 1.0% aqueous solution of purified kanamycin hydrochloride tested, $[\alpha]_D^{17}$ was $+103°$, and when a 1.0% aqueous solution of kanamycin free base was tested, $[\alpha]_D^{17}$ was $+112°$, and when a 1.0% aqueous solution of crystalline kanamycin sulfate was tested, $[\alpha]_D^{23}$ was $+121°$.

Kanamycin base exhibits no absorption of ultraviolet light from 220 m$\mu$ to 400 m$\mu$.

ACTIVITY OF KANAMYCIN

Kanamycin, when tested by the agar dilution method, showed the following antibacterial spectrum:

| Micro-Organism | Minimum Concentration for Complete Inhibition in mcg./ml. |
| --- | --- |
| S. lutea PCI-1001 | 1.8 |
| M. pyogenes var. aureus 209-P | 2.2 |
| M. pyogenes var. aureus Terajima | 0.4 |
| Micrococcus flavus | 9.0 |
| B. subtilis PCI-219 | 4.5 |
| B. subtilis NRRL-558 | 4.5 |
| B. subtilis Tracy | 9.0 |
| E. coli | 2.2 |
| S. paratyphi A | 3.1 |
| S. dysenteriae | 1.6 |
| Proteus vulgaris | 6.2 |
| Mycobacterium 607 | 3.1 |
| Mycobacterium phlei | 2.2 |
| Saccharomyces sake | >300 |
| Saccharomyces | >300 |
| Candida alibicans | >300 |
| Aspergillus niger | >300 |

In Kirchners medium it inhibited *Mycobacterium tuberculosis* $H_2$ strain at 2 mcg./ml. The streptomycin resistant *E. coli* and streptomycin-fast *Mycobacterium tuberculosis hominis* was sensitive to kanamycin.

PREPARATION OF KANAMYCIN

Procedure 1

The medium (180 l.) containing 2.0% starch, 1.0% glucose, 1.2% soybean meal, 0.3% NaCl, 0.05% KCl, 0.05% $MgSO_4 \cdot 7H_2O$, 0.1% $K_2HPO_4$, 0.2% $CaCO_3$, 0.3% $NaNO_3$, 0.002% $MnSO_4 \cdot 7H_2O$ and 0.002% $ZnSO_4 \cdot 7H_2O$ was placed in a fermenter of 400 l. volume, adjusted to pH 7.4, sterilized for 30 minutes at 120° C., inoculated with 1000 ml. of 40 hour shake-cultured broth of *S. kanamyceticus* (a selected subculture of K2-J strain) and tank-cultured at 27°–29° C. As antifoam, soybean oil (0.04%) and silicone (0.04%) were added. The results were as follows:

| Hrs. | pH | Kanamycin, mcg./ml. | Reducing sugar percent in liquid | $NH_3$-N mg. per-cent in liquid |
| --- | --- | --- | --- | --- |
| 0 | 6.6 | | 2.20 | 2.5 |
| 24 | 6.9 | | 1.50 | 10.7 |
| 36 | 7.6 | 150 | 0.4 | 1.2 |
| 48 | 7.6 | 200 | 0.3 | 1.2 |
| 60 | 8.0 | 220 | 0.3 | 6.0 |
| 72 | 8.2 | 210 | 0.25 | 12.0 |

Procedure 2

The medium (200 l.) containing 2.0% starch, 1.0% soybean meal, 0.05% KCl, 0.05% $MgSO_4 \cdot 7H_2O$, 0.3% NaCl, 0.2% $NaNO_3$ was placed in the 400 liter fermenter, the pH was adjusted to 7.5, and the medium was then sterilized (pH after the sterilization was 7.0), and further handled as in case of the Procedure 1. The broth after 48 hours was found to contain 250 mcg./ml. of kanamycin. Thereafter, the concentration of kanamycin in the broth was not markedly changed. After 65 hours of the fermentation, the broth was filtered. Thus 160 l. of filtered broth was obtained. The filtered broth contained 150 mcg./ml. of kanamycin and the pH was 8.2. The filtrate was passed through a cation exchange resin column. The column was 15 cm. in diameter and contained 6 l. of IRC–50 in the sodium form (i.e. regenerated with sodium hydroxide) at pH 8.0. Amberlite IRC–50 is a commercially available cation exchange resin of the carboxylic type; it is a copolymer of methacrylic acid and divinyl benzene. The filtrate was passed through the column at the rate of 16 l./hr. In the effluent no antibacterial activity against Mycobacterium 607 was detected by the cylinder plate method. The column was then washed with about 10 l. of distilled water which was passed through the column at the same speed as the broth filtrate. Thereafter, 1 N HCl was passed through the column at the rate of 0.8 l./hour. The eluate was collected in a 2 l. portions (cuts). After the 7th cut the eluates became acidic and the kanamycin was found in the 7th–10th cuts inclusive. The cuts containing kanamycin were combined and the combined solution (8 l. in volume) was adjusted to pH 6.0 with 10% NaOH, and concentrated (by distillation under vacuum at about 50° C.) to 3000 ml. The concentrated solution was freeze-dried. The brownish white powder of 500 g. thus obtained contained 8 g. of kanamycin. It was dissolved in 2 l. of methanol, and, after the insoluble part was removed, acetone (20 l.) was added and 80 g. of the brownish white powder was obtained. This powder contained 8 g. of kanamycin. Twenty grams of this powder were dissolved in 40 ml. of distilled water and saturated aqueous ammonium reineckate solution was added. The light pinkish precipitate which first appeared and which weighed 50 mg. was removed, and more ammonium reineckate solution was added until no more precipitate formed. This pinkish precipitate was collected and recrystallized from distilled water, and crystalline pink kanamycin reineckate (300 mg.) was obtained. It darkened at 191°–193° C. and decomposed at 211°–213° C. The light pinkish precipitate which first appeared also contained kanamycin.

Procedure 3

S. kanamyceticus (a selected subculture of K2-J strain) was inoculated to 200 l. medium placed in a 400 l. stainless steel fermenter and fermented. The medium contained starched 2.0%, glucose 1.0%, soybean meal 1.2%, NaCl 0.3%, KCl 0.05%, $MgSO_4 \cdot 7H_2O$ 0.05%; $K_2HPO_4$ 0.1%, $CaCO_3$ 0.2% and peptone 0.3%. The pH of the medium after sterilization was 7.0. Soybean oil was added to the medium at 0.1% as an antifoam. After sixty-five hours of aerated deep culture, the broth contained 220 mcg./ml. of kanamycin. The pH was 8.0. It was filtered and 170 l. of the filtrate was obtained (210 mcg./ml.). It was passed through the cation exchange resin tower. The resin tower contained 6 l. of IRC–50 resin in the sodium cycle at pH 8.0 and was 15 cm. in diameter. The rate of flow was 30 l./hour, that is, 1/12 liter of resin volume per minute. Thereafter, 30 l. water was passed through the resin tower at the rate of 30 l./hour. Kanamycin adsorbed by the resin was then eluted with 1 N HCl, the flow rate being 3.0 l./hour. The first eluate (6.5 l.) contained no activity; the following eluate contained kanamycin. Ninety percent of the adsorbed kanamycin appeared in the eluate, the pH of which was higher than 2.0. The active eluate (16.1) was adjusted to pH 7.5 with 10% NaOH. It was then diluted to 80 l. The yield here from the broth filtrate was 83%. The diluted solution was passed again through a resin column. The column contained 2 l. of IRC–50 resin in the sodium cycle at pH 7.5. The diameter of the column was 5 cm. The rate of the flow was 10 l./hour. The column was washed with 20 l. of water at a rate of flow of 10 l./hour. The adsorbed kanamycin was then eluted with 1 N HCl. The rate of flow was 3.0 l./hour. As in the previous elution kanamycin appeared in the eluate, the pH of which was higher than 2.0. The active eluate (4.5 l.) was adjusted to pH 6.0 by the addition of the anion exchange resin, IR–4B, in the hydroxyl form. Amberlite IR–4B is a commercially available weakly basic anionic exchange resin of the type described in U.S. Patent 2,591,573. It was evaporated under vacuum at about 40° C. to 500 ml. To this concentrated solution 5 liters of methanol was added and the insoluble part was removed. The filtrate was evaporated under vacuum at about 40° C. to 250 ml. and to the concentrated solution 2.5 liters of acetone was added and 65 g. kanamycin was obtained as a light brownish powder. The potency of this powder was 350 mcg./mg.

Procedure 4

The brownish white kanamycin (5 g.) obtained in Procedure 3 was dissolved in 50 ml. of 60% aqueous methanol, insoluble material was removed and to the filtrate 40 ml. of 60% aqueous methanol containing 2000 mg. of ammonium sulfate was added, and the precipitated kanamycin sulfate was collected, washed with 50 ml. of 80% aqueous methanol, and dried. Thus 4.5 g. of kanamycin sulfate was obtained as a light brownish powder. The potency was 370 mcg./mg.

Procedure 5

Kanamycin hydrochloride (10 g.; 450 mcg./mg.) obtained by a process similar to that shown in Procedure 3 was dissolved in one liter of distilled water and the pH was adjusted to 6.4. It was added to a column of 75 ml. of IRC–50 resin in the sodium form at pH 6.4 at a flow rate of 10 ml./minute. After the column was washed with 50 ml. water, the adsorbed kanamycin was eluted by 5% $NH_4OH$. The first eluate (80 ml.) had no activity and the further eluate (130 ml.) contained kanamycin. The pH of this eluate was higher than 10.0. It was evaporated under vacuum at about 40° C. to 22 ml. The yield in this concentrated solution was 97.8%. This concentrated solution was passed through a carbon column containing 20 g. of active carbon of 100–250 mesh. The diameter of the column was 2 cm. Thereafter the column was washed with 160 ml. of distilled water and chromatographically developed with 0.5 N $H_2SO_4$. The effluent was cut in about 20 ml. portions. The kanamycin sulfate appeared from the 5th cut. The 1st–4th cuts were pH 6.2–6.4 and did not contain kanamycin. Almost all of the kanamycin was found in the 5th–8th cuts as follows: 5th cut, pH 8.2, 22.0 ml., 16.9 mg./ml.; 6th cut, pH 8.6, 23.0 ml., 65.3 mg./ml.; 7th cut, 8.6, 20.0 ml., 55.0 mg./ml.; 8th cut, pH 4.6, 22.0 ml., 47.5 m./ml.; 9th cut, pH 1.0, 22.0 ml., 4.2 mg./ml. To the 6th cut 23.0 ml. of methanol was aded and crystalline kanamycin sulfate was precipitated, collected and dried. Thus 1.39 g. of crystalline kanamycin sulfate was obtained. 1.2 g. of this crystalline sulfate was dissolved in 8 ml. of water and warmed to 45° C. and 6.5 ml. of methanol was added with stirring and cooling. Then, kanamycin sulfate (1.07 g.) was precipitated and was obtained in crystalline form. Microscopically it was colorless plate crystals. It did not melt below 250° C.; $[\alpha]_D^{23} = +121°$.

Procedure 6

A very useful process for isolating pure crystalline kanamycin from fermentation broths on a large scale begins with removal of mycelium by filtration of broth which has been acidified to pH 4.5–5 with sulfuric acid. If desired this filtration is facilitated by holding the broth 12 hours at room temperature or 30 minutes at 50° C.; the thinning or increase in fluidity thus produced is attributed to the action of the enzymes present. The acid-filtered broth is then neutralized to about pH 6–7 with sodium hydroxide and absorbed on an IRC–50 resin column in the sodium form. Alternatively, the filtration is omitted and the thinned broth is diluted with an equal volume of water, put through a separator to remove particles larger than 20 mesh, neutralized and absorbed on the column.

After washing the column with water, the kanamycin is eluted with 1 N or 5% $H_2SO_4$ to provide about a tenfold volume reduction.

Then the eluate is diluted three-fold, neutralized with ammonium hydroxide and absorbed on IRC–50 resin in the ammonium form. The kanamycin is then eluted with 0.5 N $NH_4OH$ and the eluate is concentrated to about one-sixth volume by distillation in vacuo; addition to the concentrate of one to four volumes methanol followed by pH adjustment to 8.2–8.4 by addition of sulfuric acid precipitates solid kanamycin sulfate.

Kanamycin as produced by the specific procedures defined above usually consists predominantly of a single specific compound, designated kanamycin A but more usually referred to simply as kanamycin. Kanamycin also contains a closely related substance which has been designated kanamycin B. Each of these forms of kanamycin is understood to have all of the biological properties and most of the chemical and physical properties described above.

Pure kanamycin A is prepared by repeated recrystallization of the sulfate from methanol-water at pH 7.8–8.2. Pure kanamycin B is obtained by means of the preferential precipitation of its salt formed by reaction with a sodium salt of a sulfonated petroleum ($C_{16}$) hydrocarbon (Ultrawet, sodium dodecylbenzenesulfonate). Mixtures of kanamycin A and B are separated by paper-strip chromatography in Peterson's n-butanol-water-2% p-toluenesulfonic acid system on Schleicher and Schuell 589 Blue Ribbon or Whatman No. 1 papers. In this system with S&S 589 Blue Paper, kanamycin A has an Rf of about 0.35 and kanamycin B has an Rf of about 0.6. The presence of impurities or contaminating salts interferes markedly with the paper chromatography of the kanamycins in this system. Kanamycin A, but not kanamycin B, on treatment with 40% sulfuric acid for 100 minutes at 100° C. yields a product with an ultraviolet spectrum identical to that of furfural.

ISOLATION AND PURIFICATION OF KANAMYCIN A

*Kanamycin A sulfate.*—Kanamycin A was isolated from fermentation broths by adsorption on IRC–50 resin in the sodium cycle and elution with aqueous hydrochloric acid. The eluate was neutralized, diluted and readsorbed on IRC–50 which has been regenerated with ammonium hydroxide. The column was eluted with 0.2 N $NH_4OH$, the eluate concentrated in vacuo to approximately 50–100 mg./ml. of kanamycin activity, diluted with 0.8–1 volume of methanol and adjusted with $H_2SO_4$ to pH 8.0–8.2. Kanamycin A sulfate crystallized slowly in small irregular pale yellow prismatic crystals.

The crystalline kanamycin A sulfate was purified by repeated recrystallization from methanol-water at pH 7.8–8.2 to give white irregular prismatic crystals. This preparation contains absorbed moisture which is removed with difficulty. Samples for analytical determinations were dried to constant weight at 170° C. in vacuo.

*Analysis.*—Calcd. for $C_{18}H_{34}N_4O_{11} \cdot H_2SO_4$: C, 37.25; H, 6.25; N, 9.65; S, 5.52; $SO_4$, 16.6; neutral eq., 145.1. Calcd. for $C_{18}H_{36}N_4O_{11} \cdot H_2SO_4$: C, 37.13; H, 6.58; N, 9.62; S, 5.50; $SO_4$, 16.6; neutral eq., 145.6. Found: C, 37.3, 37.4, 37.3; H, 6.8, 6.6, 6.3; N, 9.3, 9.6; S, 5.5; $SO_4$, 16.8; neutral eq., 146.6.

The sulfate is soluble in water, insoluble in the common alcohols and nonpolar solvents. It shows no melting point, decomposing over a wide range above 250° C. It gave $[\alpha]_D^{24} +125°$ ($c=1$, N/10 $H_2SO_4$) on an anhydrous basis.

*Kanamycin A base.*—A 100 g. portion of kanamycin A sulfate in 2.1 of water was treated with IR410 (OH) resin in portions until the pH rose to 10.2. After removing the resin by filtering, the filtrate was concentrated to a volume of 300 ml. After diluting with an equal volume of methanol, stirring for 10 minutes with 10 g. of carbon (Darco G60), and filtering to remove the carbon, 600 ml. of warm ethanol was added with stirring. The slight amorphous precipitate which formed was removed by filtering. On further heating of the clear solution, crystallization began. After standing overnight, the product, kanamycin A base, was removed by filtering, washed with methanol-ethanol, ether and then air-dried. A yield of 71.6 g. was obtained; $[\alpha]_D^{24} +146°$ ($c=1$, N/10 $H_2SO_4$).

*Analysis.*—Calcd. for $C_{18}H_{34}N_4O_{11}$: C, 44.8; H, 7.1; N, 11.6; neut. eq. 120.6; molec. wt. 482.5. Calcd. for $C_{18}H_{36}N_4O_{11}$: C, 44.6; H, 7.5; N, 11.6; neut. eq. 121.1; molec. wt. 484.5. Found: C, 44.7, 45.0; H, 7.40, 7.6; N, 11.0, 11.5 (Dumas); 11.8, 11.8 (Van Slyke); neut. eq., 121.5; molec. wt., 468, 444 (Rast); 427,490 (Signer).

*Tetra-N-acetyl kanamycin A.*—A solution of 40 g. kanamycin A base in 360 ml. methanol and 68 ml. acetic anhydride was allowed to stand overnight. The waxy precipitate which formed was recovered by filtering and washed with a 200 ml. portion of methanol. The product was then dissolved in 200 ml. $H_2O$, stirred for ½ hour with 4 g. carbon (Darco G60) filtered and the solution concentrated to dryness in vacuo. Addition of 500 ml. methanol to this residue and slight warming converted it to a crystalline product, yield 33.8 g. The material was recrystallized by dissolving in water, concentrating to a syrup in vacuo and adding excess methanol.

*Analysis.*—Calcd. for $C_{26}H_{44}N_4O_{15}$: C, 47.9; H, 6.8; N, 8.4. Found: C, 48.5; H, 6.90; N, 8.5.

Tetra-N-acetyl-kanamycin A melted at 250°–255° C. (dec.).

*Kanamycin A picrate.*—A hot solution of 5 grams of kanamycin A in 50 ml. of water was added to a boiling solution of 8 grams of picric acid in 350 ml. of water. The resulting clear solution was allowed to cool slowly to room temperature while the crystalline picrate separated out slowly from the solution. Filtering and drying afforded 11.2 grams of crude yellow crystals. This material was recrystallized by dissolving in boiling water and allowing to cool slowly to room temperature. The yellow crystals were filtered off and dried and melted with decomposition at 225°–230° C.

*Analysis.*—The analytical sample was dried at 110° C. in vacuo. Calcd. for $C_{42}H_{48}N_{16}O_{39}$: C, 36.0; H, 3.46. Found: C, 36.2, 36.2; H, 3.62, 3.60.

Kanamycin A has an empirical formula of $$C_{18}H_{34-36}N_4O_{11}$$

Treatment of kanamycin A with methanolic HCl under conditions which hydrolyze neomycin B and C to neomycin A (neamine) resulted in recovery of unchanged starting material.

Hydrolysis of kanamycin A in aqueous 6 N HCl (20 g./100ml.) for 45 minutes at 100° C. yielded the crystalline hydrochloride of an optically inactive base which was identical with 1,3-diamino-4,5,6-trihydroxycyclohexane (desoxystreptamine) isolated from the vigorous hydrolysis of neomycin.

The wave lengths in microns of characteristic infrared absorption maxima for kanamycin A base and sulfate when pelleted in potassium bromide after drying at 176° C. are as follows:

KANAMYCIN A

| Base | Sulfate |
|---|---|
| 2.86 shoulder | 2.88 vs |
| 2.93 vs | 2.98 vs |
| 2.97 vs | 3.03 vs |
| 3.01 vs | 3.15 vs |
| 3.03 vs | 3.20 shoulder |
| 3.15 s | 3.25 shoulder |
| 3.22 s | 3.41 vs |
| 3.67 s | 3.47 vs |
| 6.23 s | 3.60 shoulder |
| 6.35 s | 3.65 shoulder |
| 6.42 shoulder | 3.78 shoulder |
| 6.75 shoulder | 3.90 shoulder |
| 6.85 m | 4.77 m |
| 6.93 m | 6.03 m |
| 7.10 s | 6.25 s |
| 7.23 s | 6.58 s |
| 7.33 s | 6.85 m |
| 7.45 s | 7.03 shoulder |
| 7.57 shoulder | 7.15 m |
| 7.63 w | 7.33 m |
| 7.75 shoulder | 7.45 shoulder |
| 7.82 m | 7.53 shoulder |
| 7.85 shoulder | 7.58 m |
| 7.90 shoulder | 7.73 w |
| 7.95 shoulder | 8.00 m |
| 8.08 w | 8.13 shoulder |
| 8.19 m | 8.23 m |
| 8.43 m | 8.30 m |
| 8.55 s | 8.50 shoulder |
| 8.68 s | 8.62 shoulder |
| 8.79 vs | 8.77 vs |
| 8.90 s | 8.85 shoulder |
| 9.00 vs | 8.95 shoulder |
| 9.20 vs | 9.18 shoulder |
| 9.47 shoulder | 9.23 shoulder |
| 9.63 vs | 9.38 vs |
| 9.85 vs | 9.57-9.82 vs |
| 10.08 vs | 9.95 shoulder |
| 10.36 shoulder | 10.15 vs |
| 10.63 m | 10.35 s |
| 10.95 m | 10.50 shoulder |
| 11.25 m | 10.74 s |
| 11.35 shoulder | 10.88 shoulder |
| 11.50 shoulder | 11.13 w |
| 11.73 w | 11.48 m |
| 11.95 m | 11.55 shoulder |
| 12.28 m | 11.93 m |
| 12.48 w | 12.43 m |
| 12.77 s | 12.78 m |
| 13.05 s | 13.15 m |

In the table, (vs) means very strong, (s) is for strong, (m) is for medium and (w) is for weak.

ISOLATION AND PURIFICATION OF KANAMYCIN B

A solution (1500 ml.) at pH 6 of kanamycin was obtained using two absorptions on IRC-50 resin in the sodium form followed by elution with sulfuric acid. To this solution there was added 45 g. sodium dodecylbenzenesulfonate (Ultrawet K) to precipitate kanamycin B dodecylbenzenesulfonate which was collected by filtration, washed with water and dissolved in methanol. The methanol solution was then acidified with sulfuric acid, leaving dodecylbenzenesulfonic acid in solution and precipitating more than 8.5 g. kanamycin B sulfate which was substantially free of kanamycin A as indicated by its bio-assay of 732 u./mgm. and its ultra-violet (furfural) assay of 45 u./mgm.

In another experiment 50 g. solid kanamycin (456 u./mgm. by bio-assay; 131 u./mgm. by ultra-violet furfural assay; ratio of 0.287 for the two assays) was dissolved at pH 6 in 2 l. water and 60 g. sodium dodecylbenzenesulfonate (Ultrawet K) was added. The precipitate was collected, water-washed and dissolved in methanol and the methanol solution was acidified with sulfuric acid to precipitate purified kanamycin B sulfate. After repetition of this process, there was obtained 9.5 g. solid kanamycin B sulfate (630 u./mgm. by bio-assay; 51 u./mgm. by furfural ultra-violet assay; ratio=0.081).

Kanamycin B base decomposes at a considerably lower temperature than kanamycin A base; thus, kanamycin B base darkens at 170° C. (corr.) and forms a dark gum on drying in vacuo at the boiling point of cymene (176° C.). Kanamycin B base exhibits $[\alpha]_D = +135°$ ($c=0.63$ in water) and contained by analysis 44.69% carbon and 7.48% hydrogen and 12.65, 13.62% nitrogen after correction for the 10.3% loss in weight found on drying a sample at 110° C.

The wave lengths in microns of characteristic infrared absorption maxima for kanamycin B base when pelletted in potassium bromide after drying at 137° C. for 15 hours in vacuo are as follows: 2.96, 3.44, 6.35, 6.48 (shoulder), 6.74, 6.85 (shoulder), 7.25, 7.45, 7.86, 8.08, 8.28, 8.76, 9.55, 9.65, 10.4 and 11.15.

About 2 g. of kanamycin B base was treated with 4 ml. acetic anhydride in 20 ml. methanol. After standing overnight, crystals of product separated. Precipitation was completed by the addition of ether and the product, tetra-N-acetyl-kanamycin B was washed with more ether, recrystallized from aqueous ethanol and found to darken at 180° C. but not to melt below 280° C. Found by analysis: C, 48.64, 48.66; H, 6.64, 6.73; N, 9.82, 9.79.

The two forms of kanamycin react as follows in the indicated qualitative tests:

| Test | A | B |
|---|---|---|
| Concentrated sulfuric acid | Colorless | Colorless. |
| Molisch | Slow formation of color. | Rapid formation of color. |
| Elson-Morgan | Weakly positive | Weakly positive. |
| Seliwanoff | Negative | |
| Folin and Ciocaltean | Weakly positive | Do. |
| Fishbach and Levin (HCl, Me₂CO) | Negative | Negative. |
| Fishbach and Levin (HCl, H₂O) | do | |
| Ninhydrin | Positive | |
| Reducing Sugar (ammoniacal silver nitrate). | Negative | |
| Sakaguchi | do | |
| Maltol | do | |
| Acid hydrolysis to "furfural" | Positive | Do. |

Comparison of the antibacterial properties of kanamycin A and kanamycin B gave the following results:

A. IN VITRO SPECTRUM BY THE AGAR DILUTION METHOD

| Organism | Minimum Inhibitory, Kanamycin A | Concentration in mcg./ml., Kanamycin B |
|---|---|---|
| Aerobacter aerogenes | 2.8 | 1.6 |
| Alcaligenes faecalis | 3.1 | 3.1 |
| Bacillus anthracis | 1.1 | 1.2 |
| Bacillus cereus | 3.1 | 1.6 |
| Bacillus cereus var. mycoides PCI #213 | 3.1 | 0.8 |
| Bacillus circulans | 1.25 | 2.5 |
| Brucella bronchiseptica | 3.1 | 1.6 |
| Clostridium welchii | >200 | >200 |
| Corynebacterium xerosis | 1.4 | 0.4 |
| Diplococcus pneumoniae | 11.2 | 12.5 |
| Gaffkia tetragena | 1.25 | 0.31 |
| Lactobacillus acidophilus ATCC #4356 | 25.0 | 25.0 |
| Lactobacillus casei ATCC #4646 | 50.0 | 25.0 |
| Micrococcus flavus ATCC #10240 | 2.5 | 1.25 |
| Mycobacterium sp. #607 | 0.31 | 0.625 |
| Neisseria sp | 2.5 | 1.25 |
| Salmonella enteritidis ATCC #4432 | 1.6 | 0.8 |
| Salmonella gallinarum | 1.6 | 1.6 |
| Salmonella paratyphi A | 1.6 | 1.6 |
| Salmonella paratyphi B | 6.25 | 3.1 |
| Salmonella pullorum | 0.8 | 0.4 |
| Salmonella schottmuelleri | 12.5 | 6.25 |
| Serratia marcescens (Wisconsin) | 3.1 | 3.1 |
| Serratia marcescens (Yale) | 6.25 | 3.1 |
| Shigella dysenteriae | 1.6 | 0.8 |
| Shigella paradysenteriae | 1.6 | 1.6 |
| Shigella sonnei | 3.1 | 6.25 |
| Streptococcus agalactiae ATCC #7077 | 25.0 | 25.0 |
| Streptococcus dysgalactiae ATCC #9926 | 3.1 | 12.5 |
| Streptococcus mitis ATCC #9811 | 100 | 50.0 |
| Streptococcus pyogenes C203 | 50 | 50 |
| Streptococcus sanguis ATCC #10556 | 50.0 | 50.0 |
| Vibrio comma | 0.8 | 0.8 |

B. ACTIVITY VERSUS MYCOBACTERIUM TUBERCULOSIS

| Organism | Minimum Inhibitory Concentration (mcg./ml.) | | |
|---|---|---|---|
| | Kanamycin A | Kanamycin B | Streptomycin |
| M. tuberculosis (H37Rv) | 0.4–0.8 | 2.0–6.0 | 0.2–0.6 |
| M. tuberculosis (H37Rvr) | 0.2–0.8 | 1.4–6.0 | >2,000 |

C. TURBIDOMETRIC ASSAY

The turbidometric assay of crystalline kanamycin B gave assay values of 3880 and 4000 mcg./mg. based on kanamycin A free base. *Micrococcus pyogenes* var. *aureus* was used as the assay organism.

D. PLATE DIFFUSION ASSAY

Kanamycin B assayed against *Bacillus subtilis* by agar diffusion techniques using kanamycin A as a standard gave the following values:

| Sample of Kanamycin B | Potency (mcg./mgm.) | Furfural Assay (mcg./mgm.) |
|---|---|---|
| B-64 | 1,000 | 0 |
| B-57 | 1,040 | 15 |
| B-65 | 1,300 | 30 |

The extraction process of the present invention is equally effective on aqueous solutions containing kanamycin A alone, kanamycin B alone and mixtures of both kanamycin A and kanamycin B.

We claim:

1. The process which comprises extracting a dilute aqueous solution of kanamycin at alkaline pH with a lesser volume of a water-immiscible lower alkanol containing, per mole of kanamycin in said aqueous solution, from one to ten moles of a member selected from the group consisting of unsubstituted aliphatic aldehydes containing from four to ten carbon atoms inclusive and aromatic aldehydes, separating the alcohol phase and subsequently extracting the kanamycin in said alcoholic solution of kanamycin at acid pH into a lesser volume of aqueous acid and separating the concentrated aqueous solution of kanamycin thus obtained.

2. The process which comprises extracting a dilute aqueous solution of kanamycin at alkaline pH with a lesser volume of n-butanol containing, per mole of kanamycin in said aqueous solution, from one to ten moles of a member selected from the group consisting of unsubstituted aliphatic aldehydes containing from four to ten carbon atoms inclusive and aromatic aldehydes, separating the alcohol phase and subsequently extracting the kanamycin in said alcoholic solution of kanamycin into a lesser volume of aqueous acid below pH 4.0 and separating the concentrated aqueous solution of kanamycin thus obtained.

3. The process which comprises extracting a dilute aqueous solution of kanamycin at alkaline pH with a lesser volume of n-butanol containing at least four moles of a member selected from the group consisting of unsubstituted aliphatic aldehydes containing from four to ten carbon atoms inclusive and monocyclic aromatic aldehydes per mole of kanamycin in said aqueous solution, separating the alcohol phase and subsequently extracting the kanamycin in said alcoholic solution of kanamycin into a lesser volume of aqueous acid below pH 4.0 and separating the concentrated aqueous solution of kanamycin thus obtained.

4. The process which comprises extracting a dilute aqueous solution of kanamycin at alkaline pH with a lesser volume of n-butanol containing at least four moles of a monocyclic aromatic aldehyde per mole of kanamycin in said aqueous solution, separating the alcohol phase and subsequently extracting the kanamycin in said alcoholic solution of kanamycin into a lesser volume of aqueous acid below pH 4.0 and separating the concentrated aqueous solution of kanamycin thus obtained.

5. The process which comprises extracting a dilute aqueous solution of kanamycin at alkaline pH with a lesser volume of n-butanol containing at least four moles of an unsubstituted aliphatic aldehyde containing from four to ten carbon atoms inclusive per mole of kanamycin in said aqueous solution, separating the alcohol phase and subsequently extracting the kanamycin in said alcoholic solution of kanamycin into a lesser volume of aqueous acid below pH 4.0 and separating the concentrated aqueous solution of kanamycin thus obtained.

6. The process which comprises extracting a dilute aqueous solution of kanamycin at alkaline pH with a lesser volume of n-butanol containing at least four moles of benzaldehyde per mole of kanamycin in said aqueous solution, separating the alcohol phase and subsequently extracting the kanamycin in said alcoholic solution of kanamycin into a lesser volume of aqueous acid below pH 4.0 and separating the concentrated aqueous solution of kanamycin thus obtained.

7. The process which comprises extracting a dilute aqueous solution of kanamycin at alkaline pH with a lesser volume of n-butanol containing at least four moles of furfuraldehyde per mole of kanamycin in said aqueous solution, separating the alcohol phase and subsequently extracting the kanamycin in said alcoholic solution of kanamycin into a lesser volume of aqueous acid below pH 4.0 and separating the concentrated aqueous solution of kanamycin thus obtained.

8. The process which comprises extracting a dilute aqueous solution of kanamycin at alkaline pH with a lesser volume of n-butanol containing at least four moles of cinnamaldehyde per mole of kanamycin in said aqueous solution, separating the alcohol phase and subsequently extracting the kanamycin in said alcoholic solution of kanamycin into a lesser volume of aqueous acid below pH 4.0 and separating the concentrated aqueous solution of kanamycin thus obtained.

9. The process which comprises extracting a dilute aqueous solution of kanamycin at alkaline pH with a lesser volume of n-butanol containing from one to ten moles of n-heptaldehyde per mole of kanamycin in said aqueous solution, separating the alcohol phase and subsequently extracting the kanamycin in said alcoholic solution of kanamycin into a lesser volume of aqueous acid below pH 4.0 and separating the concentrated aqueous solution of kanamycin thus obtained.

10. The process which comprises extracting a dilute aqueous solution of kanamycin at alkaline pH with a lesser volume of n-butanol containing at least four moles of 2-ethylhexanal per mole of kanamycin in said aqueous solution, separating the alcohol phase and subsequently extracting the kanamycin in said alcoholic solution of kanamycin below pH 4.0 into a lesser volume of aqueous acid and separating the concentrated aqueous solution of kanamycin thus obtained.

References Cited in the file of this patent

Frankel-Conrat: Proc. of The Soc. for Exptl. Biol. and Med., vol. 63, 1946, pp. 302–308.

O'Keefe et al.: J.A.C.S., July 1949, pp. 2452–2457.

King et al.: J.A.C.S., December 1955, pp. 6624–6631.

Hausman: J.A.C.S., August 5, 1956, pp. 3663–3667.

Umezawa et al.: J. Antibiotics Ser. A., September 1957, pp. 181–188.

Spector: Handbook of Toxicology, vol. II, Antibiotics, pp. 13, 20, 21, 35, 64, 101, 122, 134, 138 and 180, pub. 1957.